April 11, 1967          E. F. FABISH          3,313,411

METHOD AND APPARATUS FOR SORTING HELICAL GEARS

Filed May 11, 1965

INVENTOR.
Edward F. Fabish

BY Robert W. Beart

Don R. Wilson

His Att'ys

United States Patent Office 3,313,411
Patented Apr. 11, 1967

3,313,411
METHOD AND APPARATUS FOR SORTING HELICAL GEARS
Edward F. Fabish, Glenview, Ill., assignor to Illinois Tool Works Inc., Chicago, Ill., a corporation of Delaware
Filed May 11, 1965, Ser. No. 454,887
6 Claims. (Cl. 209—80)

This invention relates to method and apparatus for sorting helical gears which differ only in the number of teeth on the gear. As will be seen, the invention has its greatest application in the automotive industry where helical gears identical in all respects except for the number of teeth are used as the driving gear for operating the automobile speedometer.

In recent years with the large choice of engine sizes which in turn permit a variety of rear axle to engine speed ratios, problems have arisen in the matter of providing the motorist with accurate speedometer readings. To have available an assortment of speedometers would produce additional expense and the attendant difficulties in assuring the proper selection on the assembly line. To increase or decrease the diameter of the helical gear on the transmission output shaft which drives the speedometer gearing and thereby change the number of teeth for correct speedometer drive arrangement would necessitate changing distances between gear centers. This, in turn, would necessitate a supply of various sized transmission housings with an assortment of gear mounting modifications. Consequently, the automotive industry has found its problems to be minimized by developing an assortment of helical gears for use on a transmission output shaft which are of essentially identical size and shape differing only in their numbers of teeth. By selection of the proper helical gear from the available assortment an accurate speedometer reading is obtained. In other words, measurement of automobile road speeds has been standardized to the degree possible by the use of a single size helical gear to drive all speedometers of one kind, only the number of teeth on the gears selected according to the particular automobile, the correct choice of the gear being made possible only through an accurate counting of the teeth on each gear.

From the foregoing it can be seen that the one particular problem that remains is that of differentiating between the various helical gears all having the same diameter, width and bore. The present method is to use a machine counter which counts the teeth on the helical gear using a probe which clicks over the chamfered edges of the teeth and sorts the gears according to the count with about 90 percent accuracy and reliability. Such a device sorts approximately 200 gears per hour per machine which is not high productivity by industry standards. Any variation in chamfers on the sides or edges of the gear has some effect on counting accuracy and a probe or feeler device in any high volume counting is subject to extreme wear or fatique failures.

Accordingly it is a purpose of this invention to provide a method and apparatus for sorting helical gears having no conspicuous differences but varying only in the numbers of teeth.

A further object of this invention is to provide method and apparatus for sorting such helical gears which does not involve direct counting of the teeth.

An additional object of the invention is to provide method and apparatus for sorting helical gears having different numbers of teeth which can perform large quantity sorting with extremely high accuracy.

These and related objects are achieved by my invention in which each helical gear can be sorted and engaged in a portion of its gear tooth surface by a gear orienting means. The gear axis orienting means of this invention held in a fixed position, when engaged with the gear tooth surface of each helical gear, effect an axis orientation of that helical gear according to its particular helix angle. The underlying principle of the invention lies in the fact that helical gears of the same diameter, if they are to have various numbers of teeth, must have different helix angles. In proceeding from that principle the invention provides means for detecting the differences in helix angles and a method of applying those detected differences to this problem of sorting the otherwise identical helical gears according to their various helix angles.

A more detailed description of the invention can be had by reference to the drawings in which FIG. 1 is a top view of a helical rack representing one embodiment of the gear orienting means of the invention;

Figure 1:
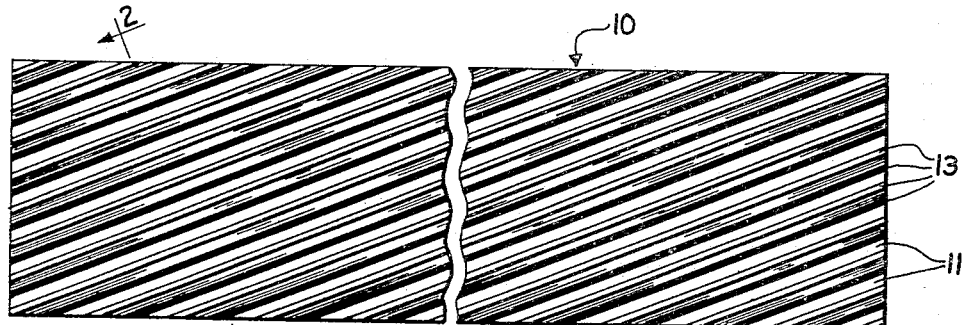

Further details and description of the invention can be had by reference first to FIG. 1 which shows one embodiment of the gear axis orienting means contemplated by the invention, this particular means shown being helical rack 10 whose teeth form an angle of approximately 68° with any line parallel to the longitudinal axis of the rack consisting of bottom lands 11, top lands 12 and intervening tooth surfaces 13 on the face or upper side of a rigid bar, the spacing and nature of the teeth being selected in relation to the same characteristics of the teeth on the helical gears to be sorted. For speed in handling gears and in order to reduce the cost of fabricating a rack, a high-pressure angle is used for the rack teeth and therefore only the roots of the helical gears being sorted carry the weight of the gear. Under such circumstances there is no conjugate action between the gear and the rack. A situation in which the helical gear and appropriately designed rack would have conjugate action would produce a rolling action due to either involute carry-over, to helical carry-over, or to both. With a high-pressure angle being employed in the rack there would be only helical carry-over. Because of this fact, within very broad limits the exact form of the teeth is not critical and therefore certain other embodiments of an equivalent nature can be employed. For example, a wire grating of parallel wires or bands appropriately held and uniformly spaced can be employed in place of rack 10, these gear axes orienting means being collectively identifiable as crest and crevice form.

Engaging the teeth of a 17-tooth helical gear with this rack and moving the gear and rack relative to each other produces an essentially "middle of the road" movement of the gear on the rack. In other words, engaging a 17-tooth helical gear with rack 10 will so align the helical gear that it will roll the length of the rack along the longitudinal axis, or along a line parallel to the longitudinal axis, of that rack.

Figure 2:
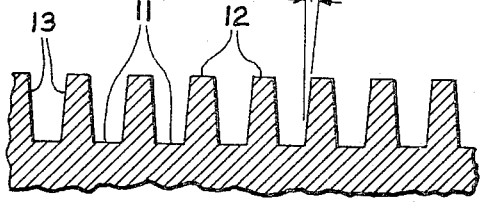
FIG. 2 is an enlarged view of the normal plane along line 2—2 of the helical rack shown in FIG. 1.

FIG. 2 further explains the nature of rack 10 suitable for the practice of this invention, this cross-section being normal to the rack teeth or along line 2—2 shown in FIG. 1. In this particular instance the pressure angle $\phi$ is on the order of only 5° and because this is less than the normal pressure angle of the helical gears, except for initial contact between gear and rack at which time gear axis orientation occurs, there is essentially no contact between rack and gear except between the top lands 12 of the rack and the gear root of the helical gear being supported.

Figure 3:
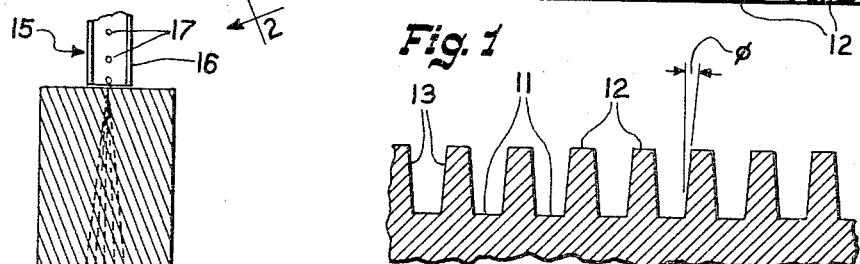
FIG. 3 is a top view of the gear tooth surface of a representative left-hand gear used on the transmission output shaft of an automobile as the driving gear in the gear system operating speedometer.

Shown in approximately full size in FIG. 3 is speedometer gear 14 being a 17-tooth left-hand helical gear with a helix angle of approximately 68°. These gears used by the automotive industry as speedometer driving gears have a bore size of approximately 1.38 inches, a face width of about 0.6 inch, an outside diameter of approximately 1.8 inches and vary in the number of teeth from 15 to 21, inclusive.

Figure 4:
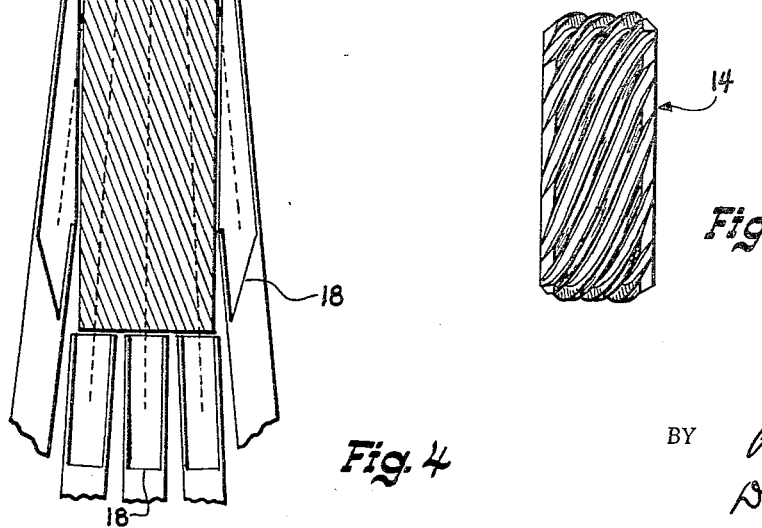
FIG. 4 is a schematic top view of a means for engaging the helical gear of FIG. 3 with the helical rack of FIG. 1 and collecting means for handling the sorted gears.

A schematic portrayal of the rack 10 is shown in FIG. 4 in combination with a gear starting means 15 which includes chute 16 from the floor of which pins 17 protrude upwardly to bring the helical gear teeth into proper position for meshing with the rack 10. The size of the pins is such as to permit a ready engagement with the gear teeth, the last two pins, which are the pins closest to the end of the rack, being spaced the same as the axial spacing of the gear form on rack 10. Gear starting means 15 is, in effect, a slot confining the axial movement of the helical gears and thereby directing their initial positioning as they approach the rack. In this way by confining axial movement, all gears to be sorted start at a pre-established position on the rack laterally within very confined limits on the order of 0.005 inch. In the particular representation shown, the one broken line parallel to the longitudinal axis of rack 10 is used to denote the line of movement of a 17-tooth helical gear along the length of the rack and into the center gear collecting means 18 positioned at the opposite end of the rack. Gear collecting means are channels through which the various paths of movement lead, gears having different numbers of teeth assuming different initial axis orientations and then following their particular orientation in a straight line as they move along the length of the rack. Specifically, a gear having more than 17 teeth will take a path to the right of the mid point on rack 10 and a gear having fewer than 17 teeth will take a path to the left of center as viewed from that end at which the gear starting means 15 places the gear on rack 10, only five paths and gear collecting means being shown.

Figure 5:
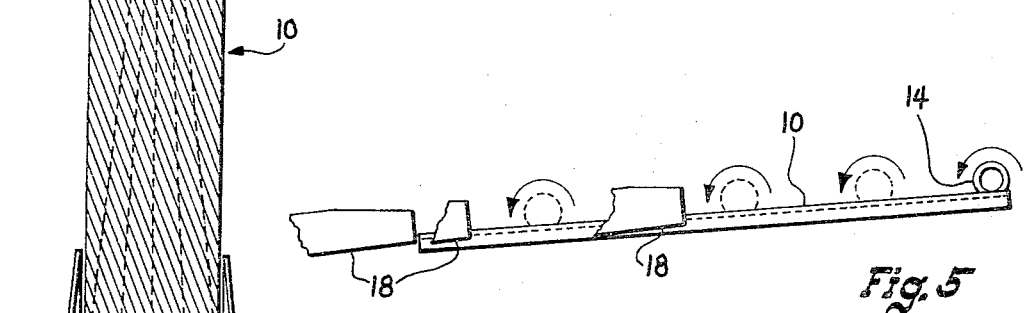
FIG. 5 is a schematic elevational view of the helical rack and collecting means portion of FIG. 4.

To most efficiently obtain relative movement between the helical gears and rack and thereby sort the gears, rack 10 is inclined and the gear 14 is placed in engagement with the rack at the upper end, moving finally into gear collecting means 18 at or toward the lower end as shown in FIG. 5.

Gear starting means, not shown in FIG. 5 but pictured in FIG. 4, is also longitudinally inclined but not necessarily at the same angle as the inclination of the rack. As indicated above, it is the function of the gear starting means to feed the helical gears in succession in such a way as to have them engage with the teeth on the rack within only very nominal deviations from a pre-established point on the upper end of the rack. In addition to the pins described for assisting engagement between gear and rack, other gear starting means can be employed such as a spinner turning in the opposite direction and placed in the floor of the starting means which would contact the top lands of the helical gears and so rotate the gears as to assist them to make engagement with the rack.

Variations are also possible in the positioning and use of the gear starting means and the gear collecting means. If gears of only one specific number of teeth are desired, only one gear collecting means can be used and all other gears rejected without sorting them. This can be accomplished by moving laterally either the gear starting means or the gear collecting means or both to inter-related positions at opposite ends of the rack which would send only the pre-selected tooth numbered gears into the gear collecting means.

It can be seen that the rack having a fixed form functions as a gear axis orienting means in engaging the teeth of helical gears having a variety of helical angles according to the numbers of teeth. After the initial engagement between gear and rack, successive engagement along the length of the rack only serves to maintain that earlier orientation. Accordingly the length and width of the rack are variable, serving only to increase the length of the arc at the lower end of the rack between the various angular displacements taken by each helical gear being sorted. A rack 1¼ inches in width and 20 inches long will permit easy sorting of five different helical gears started from a mid point at the upper end inasmuch as the helical angles of two gears having teeth numbered by successive integers (e.g. 17 and 18 teeth gears) differ by approximately 1°.

With the many modifications both mentioned and implicity present, there is no intention to limit the scope of the invention except as indicated in the following claims.

I claim:
1. Apparatus for sorting helical gears having the same diameters but different numbers of teeth which comprises gear axis orienting means for engagement with the teeth of each of said helical gears and means for selectively collecting said gears according to the axial orientation of said gears resulting from said engagement.

2. Apparatus according to claim 1 in which said gear axis orienting means is a helical rack having teeth for engagement with the teeth of each of said helical gears, the teeth on said rack forming an angle with the longitudinal axis of said rack approximating the average of the helix angles of said helical gears to be sorted.

3. Apparatus for sorting helical gears having the same diameters but different numbers of teeth which comprises gear axis orienting means for engagement with the teeth of each of said helical gears, gear starting means for engaging said helical gears with said gear axis orienting means and gear collecting means selectively sorting said gears as they are disengaged from said gear axis orienting means.

4. Apparatus according to claim 3 in which said gear axis orienting means is a helical rack having teeth for engagement with the teeth of each of said helical gears, the teeth on said rack forming an angle with the longitudinal axis of said rack approximating the average of the helix angles of said helical gears to be sorted.

5. A method for sorting helical gears having the same diameters but different numbers of teeth which comprises engaging the teeth of each of said helical gears with a fixed crest-and-crevice form whereby each of said gears is axially and selectively collecting said gears according to the axial positioning of said gears when engaging said crest-and-crevice form.

6. A method for sorting helical gears having the same diameter but different numbers of teeth and different helix angles which comprises engaging the teeth of each of said helical gears with a helical rack, producing relative movement between said gears and said rack whereby each of said gears is axially oriented according to its helix angle, and selectively collecting said gears as they move out of engagement with said rack in accordance with the axial positioning of said gears during said relative movement.

References Cited by the Examiner
UNITED STATES PATENTS 2,761,560 9/1956 Pomernacki _____ 209—88
2,815,579 12/1957 Bassoff _____ 33—175.5
3,099,882 8/1963 Gates _____ 209—88 X M. HENSON WOOD, JR., *Primary Examiner.*

ALLEN N. KNOWLES, *Examiner.*